United States Patent [19]

Marfiewicz

[11] 3,964,852
[45] June 22, 1976

[54] DEVICE FOR PRODUCING HOLLOW BODIES OF THERMOPLASTIC MATERIAL

[75] Inventor: Wilhelm Marfiewicz, Berlin, Germany

[73] Assignee: Emil Korsch Spezialfabrik fur Komprimiermaschinen, Germany

[22] Filed: Sept. 30, 1975

[21] Appl. No.: 618,112

[52] U.S. Cl. .......................... 425/326 B; 425/451.9
[51] Int. Cl.² ......................................... B29D 23/03
[58] Field of Search .......... 425/451.9, 451.7, 242 B, 425/324 B, 387 B, 326 B, DIG. 205, DIG. 221; 249/165

[56] References Cited
UNITED STATES PATENTS

| | | | |
|---|---|---|---|
| 2,319,479 | 5/1943 | Ryder | 425/451.9 |
| 2,879,545 | 3/1959 | Bailey | 425/451.7 |
| 3,877,861 | 4/1975 | Kiefer et al. | 425/387 B |

Primary Examiner—Richard B. Lazarus
Attorney, Agent, or Firm—McGlew and Tuttle

[57] ABSTRACT

The device is of a type including a multi-part hollow mold mounted in a closure assembly, having a frame and movable in a housing between a blow station and a plasticating unit, on relatively movable mold platens carried by two supporting bars extending below the hollow mold in the closure assembly. A locking mechanism is provided on the upper parts of the mold platens and comprises a locking bush firmly secured to one mold platen and a locking rod rotatably mounted in the other mold platen but fixed against axial displacement relative thereto. The locking rod has a lock head, designed as a symmetric hammer head, adapted to lockingly engage in the locking bush which has an opening conformable to the hammer head and formed with diametrically opposite catch webs, the hammer head having faces adapted to engage behind the catch webs upon rotation of the locking rod. The locking mechanism is located at the corner of a right triangle situated in the junction plane of the hollow mold and whose other corners are the axes of the two supporting bars, the right angle of the triangle being at the axis of that supporting bar which is the trailing supporting bar considered in the direction of movement of the closure assembly from the blow station toward the plasticating unit.

8 Claims, 8 Drawing Figures

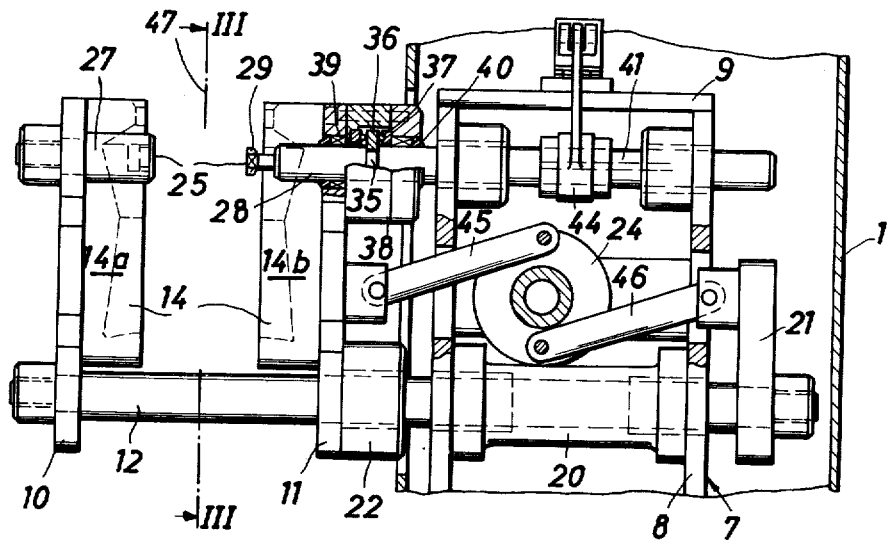
Fig.2
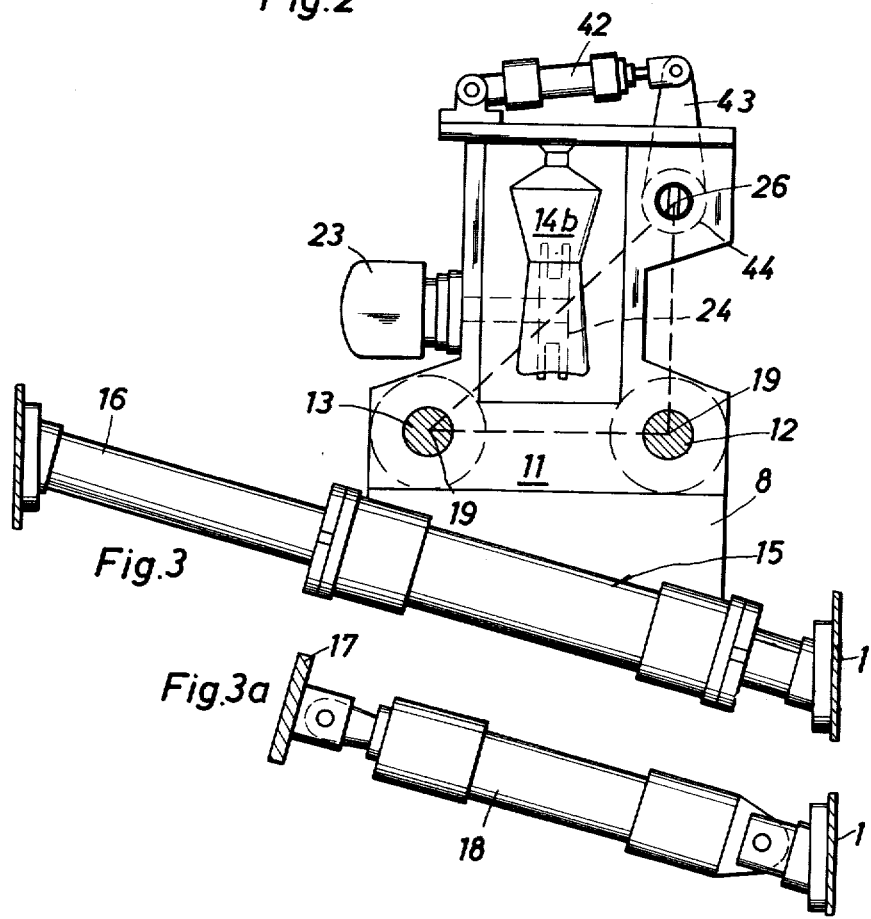
Fig.3
Fig.3a

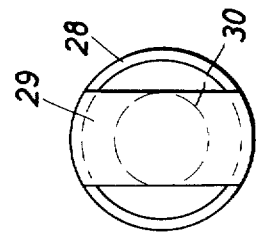
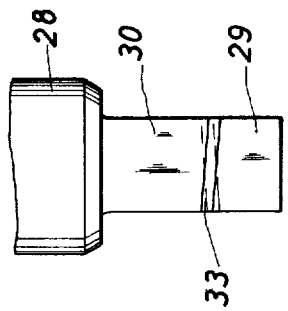
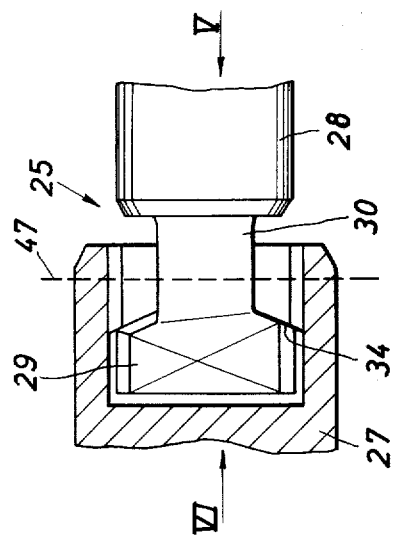
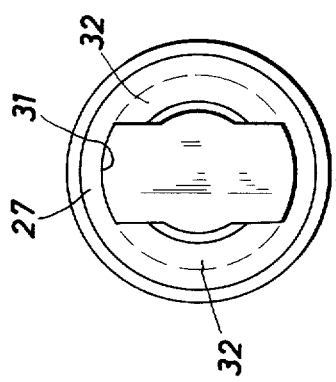

DEVICE FOR PRODUCING HOLLOW BODIES OF THERMOPLASTIC MATERIAL

FIELD AND BACKGROUND OF THE INVENTION

The present invention relates to a device for producing hollow bodies of thermoplastic material, of the type comprising a multi-part hollow mold mounted in a movable closure assembly on movable mold platens which are carried by two supporting bars extending below the hollow mold.

In a known device of this kind, the supporting bars necessary for guiding the mold platens are mounted on the lower part of the closure assembly. Consequently, with the mold open, the intermediate space between the mold platens, in which the multi-part hollow mold is located, is freely accessible so that larger molded bodies can be removed immediately after the opening of the hollow mold, without hindrence by the bars. This is not possible in other known devices since in these, at least one supporting bar is provided in the upper part of the closure assembly.

However, when the supporting bars are provided only in the lower part of the closure assembly, a risk is run that, during the blowing, the mold halves spread apart at the ends of the mold platens which are remote from the bars. In this connection, it is to be considered that the mold halves may be exposed to pressures up to 15 Mp (15 metric tons) and more. To absorb the forces thereby produced and thrusting the mold halves apart during the blowing, in the known device, the mold platens are strongly reinforced by thick plates and ribs. In addition, the supporting bars have a very large diameter since they have to support the large mass of the heavy mold platens. In consequence, the closure assembly comprises a huge mass which can be moved only with a high energy supply, wherefor the device becomes uneconomical in operation. Also in the known device, the mold halves are pivotally mounted on the mold platens and bear against them through accumulators. This measure makes the known device still more expensive and relatively susceptible to trouble.

SUMMARY OF THE INVENTION

The present invention is directed to a device for the first-mentioned type in which the known light-weight construction of the closure assembly with supporting bars located in the upper and lower part is maintained and, in spite of the provision of two supporting bars in only the lower part of the closure assembly, the blow pressure is absorbed without a deflection of the supporting bars and, thereby, without cleaving the mold at its end remote from the bars. In addition, a rapid and secure closing of the mold parts is assured.

To attain this objective, it is provided, in accordance with the invention, that, in the upper part of the mold platens, a locking mechanism is mounted comprising a locking bush which is firmly secured to one of the mold platens, and a locking rod which is mounted for rotation in the other mold platen and fixed against axial motion therein. The locking rod is provided with a lock head which is designed as a symmetric hammer head adapted to engage the locking bush. The locking bush is formed with an opening which is conformable to the lock head and provided with diametrically opposite catch webs. The faces of the hammer head engaging behind the catch webs extend circumferentially of the locking rod and obliquely relative to the axis of the rod. The locking mechanism is located at the corner point of a right triangle which is situated in the junction plane of the hollow mold, the other corner points of the triangle being formed by the axes of the two supporting bars and the right angle of the triangle being adjacent the axis of that supporting bar which, considered in the direction of motion of the closure assembly from the blow station toward the plasticating unit, is the trailing supporting bar.

Due to this design of the device, the lightweight construction of a conventional closure assembly, having supporting bars arranged above and below the hollow mold, can be maintained. The mold platens and supporting bars which can be made relatively light, have little mass which, during the motion of the closure assembly from its extrusion position in which a preform is received to its blow position in which the preform is molded and inversely, requires only a small supply of energy and, in addition, insures a vibration-free operation of the machine. With the high travel velocities of the closure assembly for obtaining a high frequency of cycles, as small masses as possible of the closure assembly are sought, and the invention meets this requirement. In consequence, only small acceleration and deceleration forces are produced.

Further, due to the inventive arrangement of the locking mechanism, the free access to the opened hollow mold is not obstructed in any way so that, despite the locking mechanism, even larger molded bodies can be removed immediately after the opening of the hollow mold without any hindrance by parts of the locking mechanism and even before the hollow mold has been moved away. Finally, a decisive factor for obtaining a high frequency of cycles is the particular, inventive, design of the locking mechanism with the hammer head faces engaging the catch webs from behind and extending, in the circumferential direction of the locking rod, obliquely to the axis of the rod. By means of the inventive locking mechanism, the interlocking of the two mold platens and, thereby, of the two parts of the hollow mold, can be effected within a swiveling angle of the locking rod of less than 90° (in a constructed device, the angle has been 40°) and, due to the hammer head faces engaging the catch webs from behind and extending in the circumferential direction of the locking rod and obliquely to the axis thereof, a pressing together of the parts of the hollow mold is obtained in the shortest period of time.

According to a further development of the invention, the back faces of the catch webs, which are engaged by the hammer head, are beveled in the radial direction toward the opening of the locking bush, and the faces of the hammer head engaging the catch webs from behind extend in the radial direction obliquely to the outside. The rapid and secure engagement of the hammer head in the locking bush is thereby supported in addition while the wear is minimized.

An object of the invention is to provide an improved device, for producing hollow bodies of thermoplastic material, in which the known light-weight construction of a closure assembly with supporting bars located in the upper and lower parts is maintained in spite of the provision of two supporting bars in only the lower part of the closure assembly.

Another object of the invention is to provide such a device in which the blow pressure is absorbed without a deflection of the supporting bars and without cleaving the mold at its end remote from the supporting bars.

A further object of the invention is to provide such a device in which a rapid and secure closing of the mold parts is assured.

Yet another object of the invention is to provide such a device including a novel locking mechanism located in the upper parts of the mold platens.

For an understanding of the principles of the invention, reference is made to the following description of a typical embodiment thereof as illustrated in the accompanying drawings.

BRIEF DESCRIPTION OF THE DRAWINGS

In the Drawings:

FIG. 2 is a side elevation view of the closure assembly, with the hollow mold open;

FIG. 3 is a sectional view taken along the line III—III of FIG. 2;

FIG. 3a is a side elevation view of a piston and cylinder unit for moving the closure assembly;

FIG. 4 is an enlarged detail, partly in section, of the locking mechanism of the device;

FIG. 5 is a view in the direction of the arrow V of FIG. 4, illustrating the locking bush of the locking mechanism;

FIG. 6 is a view in the direction of the arrow VI of FIG. 4, illustrating the locking head of the locking rod of the locking mechanism; and FIG. 7 is a top plan view of the locking head of the locking rod.

DESCRIPTION OF THE PREFERRED EMBODIMENT

Figure 1:
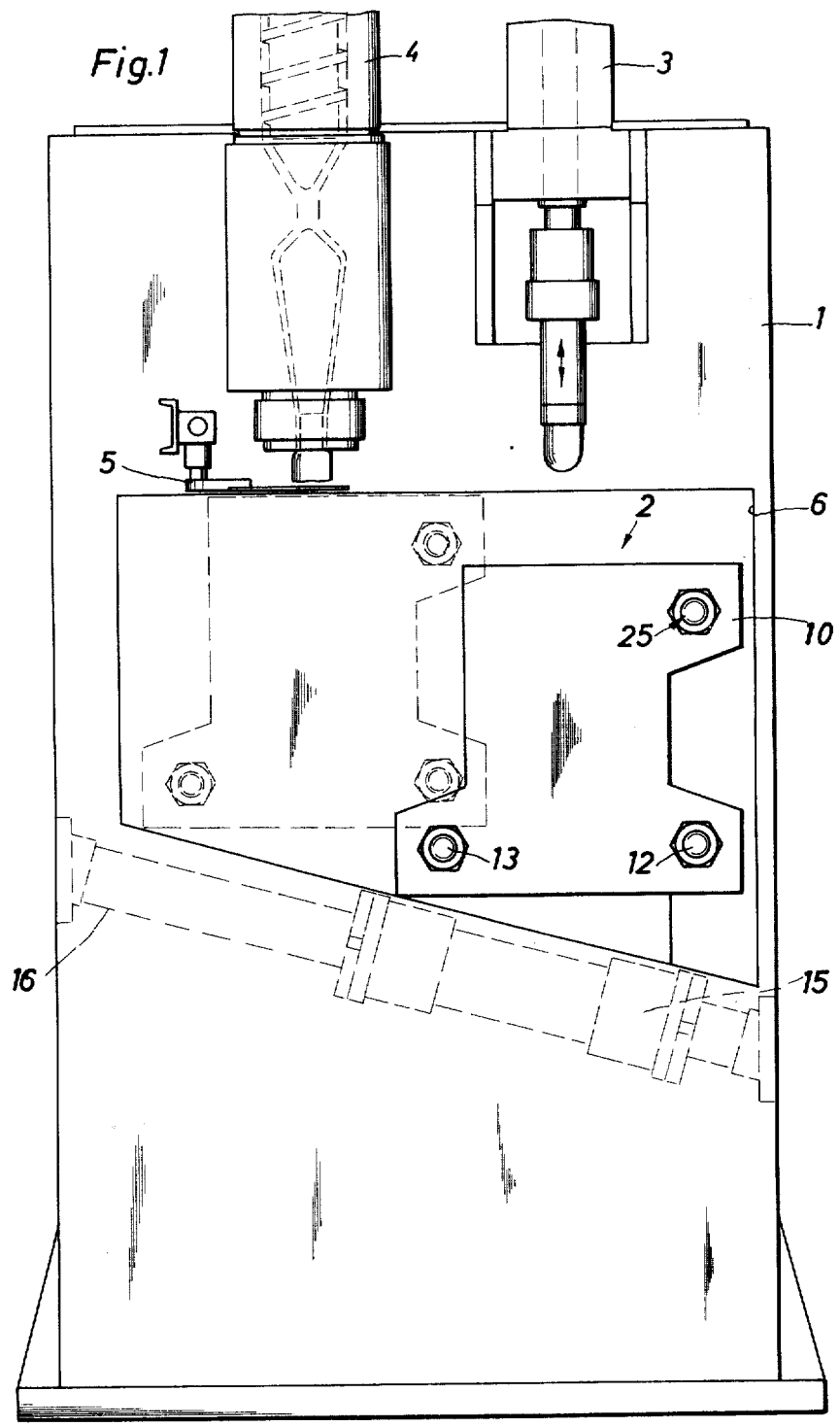
FIG. 1 is a front elevation view of a device embodying the invention showing the mold platens in their blow position, in solid lines, and in their extrusion position, in broken lines.

The device for producing hollow bodies of thermoplastic material comprises, as shown in FIG. 1, a housing 1, a closure assembly 2 which is movable in the housing along an inclined plane, a blow station 3 mounted in front of housing station 1 and a plasticating unit 4 mounted laterally of the blow station and also in front of housing 1, as well as a separating unit 5 which is mounted below the plasticating unit. Closure assembly 2 is shown in its blow position below the blow station 3 in solid lines, and in its extrusion position below the plasticizing unit 4 in broken lines.

Closure assembly 2 extends through housing 1 within an opening 6. The assembly comprises a frame 7 (FIG. 2) which is mounted within housing 1 and includes vertical plates 8 and a horizontal cover plate 9, as well as mold platens 10, 11 which are mounted outside the housing 1, supporting bars 12, 13 guiding the mold platens, and a hollow mold 14 which is formed of mold halves 14a and 14b.

Frame 7 of closure assembly 2 supports guide members (FIG. 3) which are provided at the lower end of platen 6 and slide on guide tubes 16. Guide tubes 16, which are spaced from each other and extend in parallel, are firmly secured to the side walls of housing 1 and extend at an angle relative to the horizontal so that hollow mold 14, along with closure assembly 2, can be moved upwardly or downwardly, from the blow position into the extrusion position and inversely. Guide members 15 are connected to each other by a crosstie 17 (FIG. 3a) engaged by one end of a piston and cylinder unit 18 located between guide tubes 16 and secured, by its other end, to housing 1. Thus, the shown piston and cylinder unit 18 is positioned between guide tubes 16 below frame 7.

The axes 19 of supporting bars 12, 13 are situated in a horizontal plane, relative to which the mutually concentric axes of guide members 15 and associated guide tubes 16 are inclined at an appropriate angle.

Supporting bars 12, 13 are mounted in guide bearings 20 which extend between plates 8 of frame 7. To one end of supporting bars 12, 13 mold platen 10 is firmly secured by screws while, at their other ends, supporting bars 12, 13 are rigidly connected to each other by means of a crosshead 21. Mold platen 11 slides, by means of guide bushings 22, on supporting bars 12, 13. Motion is imparted to mold platen 11 by a swivel disk 24 which is mounted in frame 7 in a vertical orientation and driven by a motor 23 (FIG. 3), through links 45, 46 of which link 45 is pivoted directly to mold platen 11 and link 46 is pivoted to crosshead 21 by which supporting bars 12, 13 are rigidly interconnected at their end remote from mold platen 10.

In the upper part of mold platens 10, 11, a locking mechanism 25 is provided for locking mold platens 10, 11 to each other while hollow mold 14 is closed. Locking mechanism 25 is disposed at a corner point 26 of a triangle which is situated in the junction plane 47 of hollow mold 14 and whose other corner points are formed by the axes 19 of supporting bars 12, 13. Locking mechanism 25 extends parallel to axes 19 and comprises a locking bush 27 which is firmly secured to mold platen 10, and a locking rod 28 which is mounted for rotation in the other mold platen 11 but secured against axial displacement therein and which, with the hollow mold 14 closed, can be interlocked, by means of a lock head 29, with locking bush 27. Lock head 29 is designed as a symmetric hammer head provided at the end of a neck 30 of locking rod 28. Locking bush 27 comprises an opening 31 which is conformable to the hammer head, and diametrically opposite catch webs 32 which are located in the zone of opening 31 and behind which the hammer head, after being introduced into locking bush 27, can be locked by turning locking rod 28. Behind catch webs 32, opening 31 of locking bush 27 is enlarged to a cylindrical bore.

Faces 33 of the hammer head, engaging catch webs 32 from behind, extend in the circumferential direction of locking rod 28 obliquely to the axis of the rod and, in radial direction, obliquely to the outside. Back faces 34 of catch webs 32 against which the hammer head engages are beveled in the radial direction toward opening 31 of locking bush 27. This beveling of faces 33 and 34 results in a tight fit of the interlocked locking mechanism 25.

To obtain a rotary mounting of locking rod 28 in mold platen 11 along with a security against axial displacement thereof, locking rod 28 is provided with a groove 36. A split ring 36 (FIG. 2) engages in the groove and its radially extending surfaces engage antifriction bearings 37 mounted on flanges 38 carried by mold platen 11. Locking rod 28 is radially mounted within flanges 38 by means of further antifriction bearings 39. Gaskets 40 prevent dirt from penetrating into the zone of the bearings.

Locking rod 28, mounted for mechanical engagement in mold platen 10, extends through mold platen 11 and flange 38 and is further mounted by its shank portion 41, in frame 7 which accommodates the drive for moving mold platens 10, 11. Here, locking rod 28 is actuated for pivoting by a drive unit 42, through a locking lever 43. Drive unit is designed as a fixed piston and cylinder unit having its piston rod pivoted to locking lever 43. Locking rod 28 is connected to locking lever 43 for rotary motion therewith but so as to be axially shiftable, wherefore locking lever 43 is provided with a sleeve 44 and a key element fitting in and cooperating with a groove provided in locking rod 28.

Locking mechanism 25 is actuated by piston and cylinder unit 42 as soon as mold platens 10, 11 are butted to each other and hollow mold 14 is closed. Since locking bush 27 is firmly screwed to mold platen 10 and locking rod 28 is rotatable in mold platen 11 but axially fixed relative thereto, with platens 10, 11 abutting, lock head 29 penetrates into opening 31 of locking bush 27, the mechanism being adjusted so as to always insure an alignment of lock head 29 with opening 31. Immediately upon closure of the hollow mold, drive unit 42 is actuated and, thereby, a rotary motion of locking rod 28 is produced, whereby lock head 29 is pivoted to engage behind catch webs 32 of locking bush 27. Thus, a firm junction of mold platens 10, 11 is obtained also at their sides which are remote from supporting bars 12, 13 so that, even with high blow pressures, a separation of the hollow mold 14 is prevented.

While a specific embodiment of the invention has been shown and described in detail to illustrate the application of the principles of the invention, it will be understood that the invention may be embodied otherwise without departing from such principles.

What is claimed is:

1. In a device for producing hollow bodies of thermoplastic material, of the type including a multi-part hollow mold mounted in a closure assembly, having a frame and movable in a housing between a blow station and a plasticating unit, on relatively movable mold platens carried by two supporting bars extending below the hollow mold in the closure assembly, the improvement comprising a locking mechanism provided on the upper parts of the mold platens, said locking mechanism comprising, in combination, a locking bush firmly secured to one mold platen; and a locking rod rotatably mounted in the other mold platen but fixed against axial displacement relative thereto; said locking rod having a lock head, designed as a symmetric hammer head, adapted to lockingly engage said locking bush; said locking bush having an opening conformable to said hammer head and formed with diametrically opposite catch webs; said hammer head having faces adapted to engage behind said catch webs upon rotation of said locking rod, said faces extending circumferentially of said locking rod and obliquely relative to the axis thereof; said locking mechanism being located at the corner of a right triangle situated in the junction plane of said hollow mold and whose other corners are the axes of said two supporting bars, the right angle of said triangle being at the axis of that supporting bar which is the trailing supporting bar considered in the direction of movement of said closure assembly from said blow station toward said plasticating unit.

2. In a device for producing hollow bodies of thermoplastic material, a locking mechanism, as claimed in claim 1, in which said catch webs have back faces, engageable by the hammer head, beveled radially toward said locking bush opening; the faces of said hammer head, engageable with said catch webs from behind, extending radially obliquely toward the outside.

3. In a device for producing hollow bodies of thermoplastic material, the improvement claimed in claim 1, in which said locking rod is formed with a peripheral groove; a split ring engaging in said groove; antifriction bearings engaging the opposite radially extending sides of said split ring; and flanges on said other mold platen engaging said antifriction bearings.

4. In a device for producing hollow bodies of thermoplastic material, the improvement claimed in claim 1, in which said other mold platen is closer to said housing than said one mold platen and has said locking rod extending therethrough; said locking rod having a shank portion mounted in said frame; a drive for the mold platen motion accommodated in said closure assembly; a locking lever secured to said shank portion; and a drive unit, for rotating said locking rod, operatively connected to said locking lever and mounted in said closure assembly.

5. In a device for producing hollow bodies of thermoplastic material, the improvement claimed in claim 4, in which said drive unit is a piston and cylinder unit including a cylinder connected to said frame and a piston rod connected to said locking lever; and means connecting said locking lever to said locking rod restraining relative rotation of said locking lever and said locking rod while providing for relative axial displacement of said locking lever and said locking rod.

6. In a device for producing hollow bodies of thermoplastic material, the improvement claimed in claim 4, in which said drive for said mold platen motion comprises a disk oscillatably mounted on said closure assembly and oscillatable in a vertical plane; a crosshead fixedly interconnecting the ends of said supporting bars remote from said one mold platen; and a pair of links pivotally connected to said disk, one link being pivotally connected directly to said other mold platen and the other link being pivotally connected to said crosshead.

7. In a device for producing hollow bodies of thermoplastic material, the improvement claimed in claim 1, in which the axes of said supporting bars are situated in a horizontal plane; said frame including two guide members mounted below said supporting bars and having longitudinal axes extending perpendicular to the axes of said supporting bars and at an angle to said horizontal plane; respective guide tubes extending through said guide members and mounting the same for sliding movement, said guide tubes being fixed to said housing and inclined at equal angles to said horizontal plane; and actuator means operable to slide said guide members along said guide tubes to move said hollow mold and said closure assembly from an extrusion position, in which a preform is received from said plasticating unit, into a blow position, in which said preform is molded at said blow station.

8. In a device for producing hollow bodies of thermoplastic material, the improvement claimed in claim 7, in which said actuator means comprises a piston and cylinder unit; a crosstie interconnecting said guide members; and means connecting one end of said piston and cylinder unit to said housing and the other end thereof to said crosstie.

\* \* \* \* \*